(12) United States Patent
Jones et al.

(10) Patent No.: US 12,091,942 B2
(45) Date of Patent: Sep. 17, 2024

(54) DOWNHOLE ENERGY HARVESTING SYSTEM

(71) Applicant: The Charles Machine Works, Inc., Perry, OK (US)

(72) Inventors: Klayton Day Jones, Perry, OK (US); Scott B. Cole, Edmond, OK (US); Bradley S. Marshall, Perry, OK (US); Brian K. Bailey, West Des Moines, IA (US)

(73) Assignee: The Charles Machine Works, Inc., Perry, OK (US)

( * ) Notice: Subject to any disclaimer, the term of this patent is extended or adjusted under 35 U.S.C. 154(b) by 30 days.

(21) Appl. No.: 18/170,323

(22) Filed: Feb. 16, 2023

(65) Prior Publication Data

US 2023/0332488 A1    Oct. 19, 2023

Related U.S. Application Data

(60) Provisional application No. 63/311,209, filed on Feb. 17, 2022.

(51) Int. Cl.
*E21B 41/00* (2006.01)
*E21B 7/04* (2006.01)
*E21B 7/26* (2006.01)
*E21B 47/13* (2012.01)
*H02J 50/00* (2016.01)

(52) U.S. Cl.
CPC .......... *E21B 41/0085* (2013.01); *E21B 7/267* (2020.05); *E21B 47/13* (2020.05); *H02J 50/001* (2020.01); *E21B 7/046* (2013.01)

(58) Field of Classification Search
CPC ...... E21B 41/0085; E21B 47/13; E21B 7/267; E21B 7/046; H02J 50/001
See application file for complete search history.

(56) References Cited

U.S. PATENT DOCUMENTS

| 11,319,797 | B2 | 5/2022 | Morse et al. |
| 11,442,194 | B2 | 9/2022 | Cole |
| 11,913,335 | B2 * | 2/2024 | Peters ..................... E21B 7/067 |

* cited by examiner

*Primary Examiner* — Carlos Amaya
(74) *Attorney, Agent, or Firm* — Tomlinson McKinstry, P.C.

(57) ABSTRACT

A downhole energy harvesting system configured for use in a downhole tool. The system utilizes at least one harvesting antenna supported within the downhole tool. During operation, the harvesting antenna harvests energy from a beacon signal emanating from a beacon included in the downhole tool. The harvested energy is used to power electronics included within the downhole tool during the course of a boring operation.

21 Claims, 11 Drawing Sheets

DOWNHOLE ENERGY HARVESTING SYSTEM

RELATED APPLICATIONS

This application claims the benefit of U.S. provisional patent application Ser. No. 63/311,209, authored by Jones et. al, and filed on Feb. 17, 2022, the entire contents of which are incorporated herein by reference.

BACKGROUND

Figure 1:
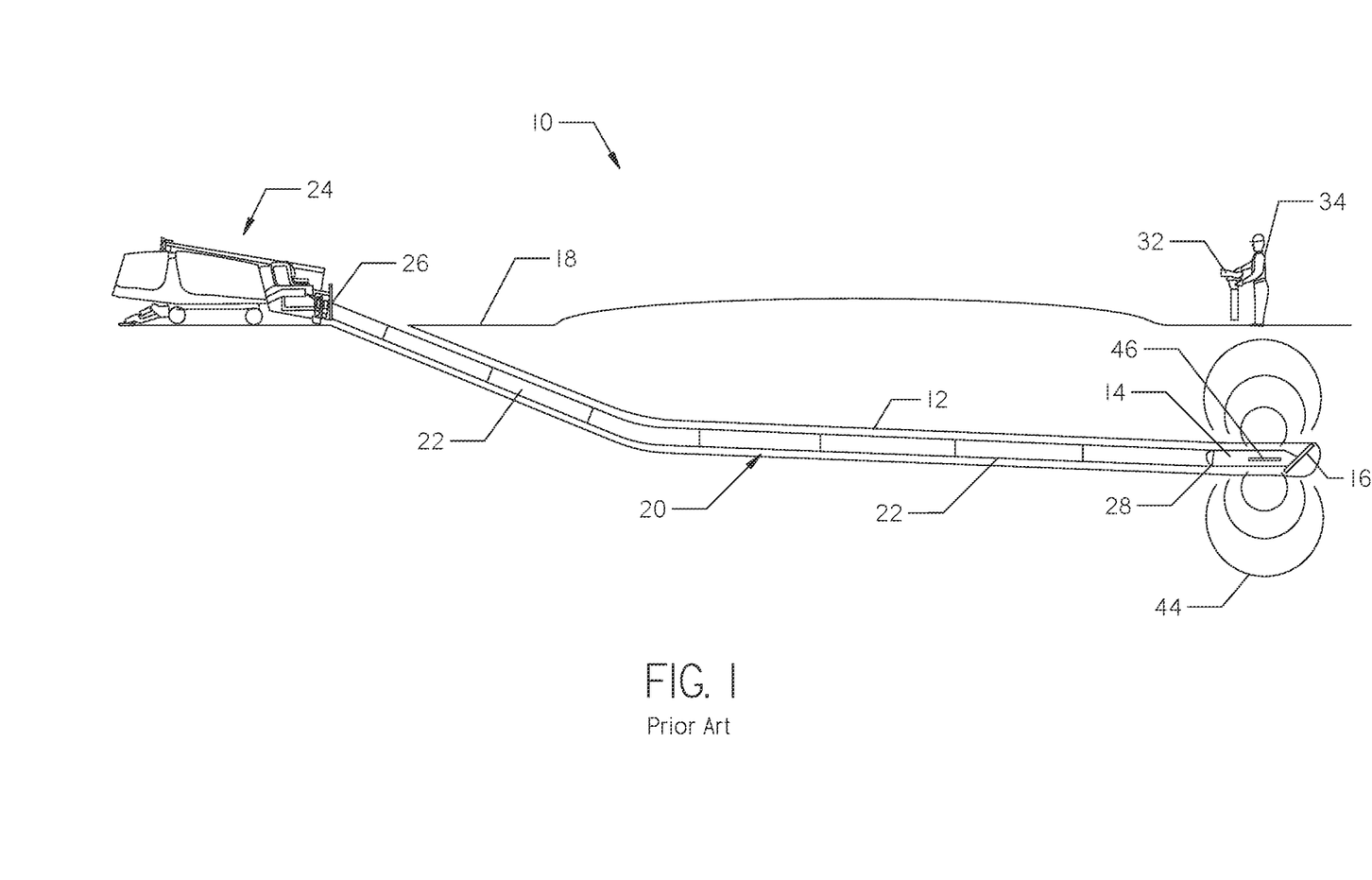
FIG. 1 is an illustration of a horizontal directional drilling operation.

With reference to FIG. 1, a horizontal directional drilling system 10 is shown. The system 10 is used to create a borehole 12 underground. The borehole 12 provides space for underground infrastructure, such as utility lines, to be installed and is created using a downhole tool 14 carrying a drill bit 16. The downhole tool 14 is advanced beneath a ground surface 18 using a drill string 20. The drill string 20 is made of a plurality of hollow pipe sections 22 joined end-to-end in torque-transmitting engagement. A drill rig 24 supported on the ground surface 18, and operated by a rig operator, grips a first end 26 of the drill string 20 while the opposed second end 28 is attached to the downhole tool 14. During operation, thrust and rotational forces are transmitted from the drill rig 24 to the drill bit 16 by the drill string 20.

Figure 6:
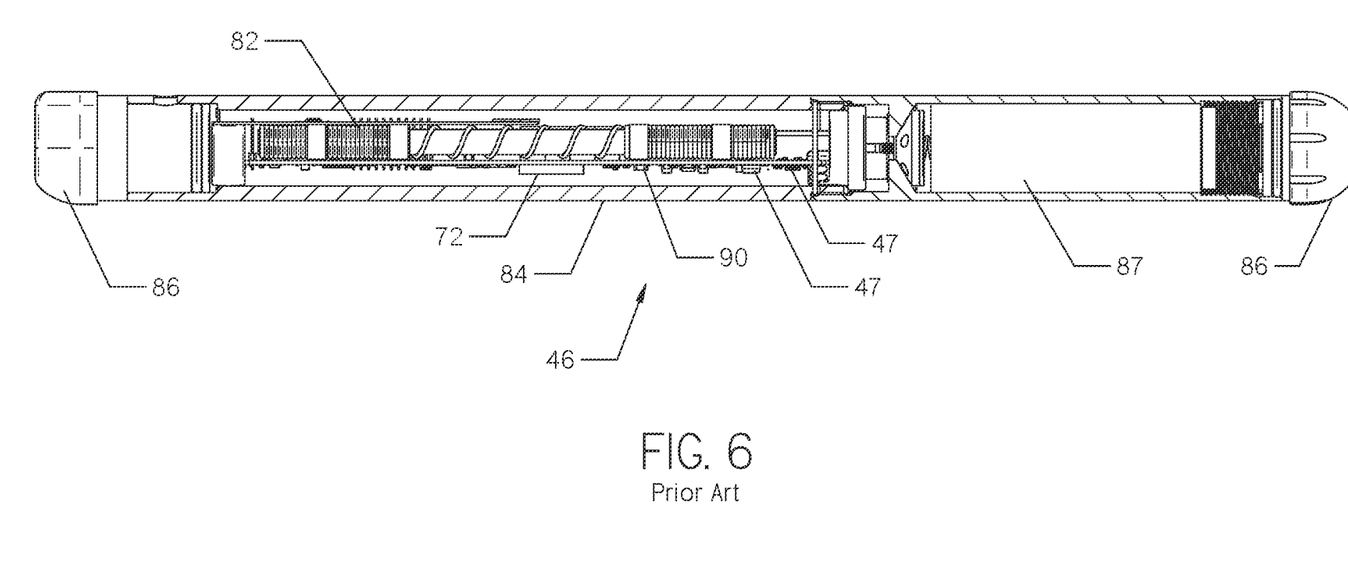
FIG. 6 is a cross-sectional view of the beacon shown in FIGS. 3 and 4, taken along a longitudinal axis of the beacon.

Continuing with FIGS. 1 and 6, the downhole tool 14 houses a beacon 46. The beacon 46 comprises a transmitting antenna 82 installed within a tubular or beacon housing 84, as shown in FIG. 6. Then transmitting antenna 82 is configured to emit a magnetic dipole signal or "beacon signal" 44 to an above-ground tracker 32. The above-ground tracker 32, operated by a tracker operator 34, is configured to detect and analyze the beacon signal 44 in order to determine the downhole position of the beacon 46. The beacon signal 44 includes information about the beacon 46 as well as the downhole conditions, such as the downhole temperature and fluid pressure. One embodiment of a an above-ground tracker 32 and its methods of use are described in U.S. Pat. No. 7,786,731, issued to Cole et al., the entire contents of which are incorporated herein by reference.

Information regarding the underground environment experienced by the downhole tool 14 is important as more infrastructure continues to be installed underground. In order to acquire sufficient information about the underground environment, a number of different sensors may be installed within the downhole tool 14.

As shown in FIG. 6, one or more sensors 47 are typically installed within the beacon housing 84 and powered by a battery 87 also contained within the beacon housing 84. However, the beacon 46 is encased within the downhole tool 14 and not in direct contact with the borehole 12. The sensors 47 installed within the beacon housing 84 may thus be disadvantageously positioned for measuring the underground environment. For example, a pressure sensor may provide more accurate pressure readings of the borehole 12 if positioned near an outer surface of the downhole tool 14 instead of inside the beacon housing 84. One example of a pressure sensor 49 being installed near an outer surface a downhole tool 42 is shown for example in FIG. 5 and described in detail in U.S. Pat. No. 11,319,797, issued to Morse, the entire contents of which are incorporated herein by reference.

If one or more sensors are installed within the downhole tool 14 and outside of the beacon housing 84, a second power source is required to power such sensors as they are no longer in communication with the battery 87 installed within the beacon housing 84. However, installing a second battery within the downhole tool 14 may not be practical given the limited amount of space within the downhole tool 14. Further, access into the downhole tool 14 for replacing or recharging the second battery may be limited depending on the installation requirements of the sensors. For example, some sensors may need to be sealed within certain areas of the downhole tool 14. There is a need in the art for a way to power sensors and other electronics not enclosed within the beacon 46 over the entire course of operation without sacrificing valuable space within the downhole tool 14.

SUMMARY

The present disclosure is directed to a downhole tool comprising an elongate housing having a cavity formed therein. The downhole tool further comprises a beacon installed within the cavity and comprising a transmitting antenna. The transmitting antenna is configured to emit a magnetic signal. The downhole tool further comprises a harvesting antenna and an energy storage device. The harvesting antenna is installed within the housing and is situated within a pathway of the magnetic signal. The energy storage device is installed within the housing and is in communication with the harvesting antenna and one or more sensors installed within the housing. The harvesting antenna is configured to harvest power from the magnetic signal and transmit the harvested power to the energy storage device.

The present disclosure is further directed to a downhole tool comprising a beacon configured to emit a magnetic dipole field. The downhole tool also comprises an elongate housing having an exterior surface within which a cavity is formed. The cavity receives the beacon and has an open mouth that joins the exterior surface of the housing. The downhole tool further comprises a lid configured to close the mouth of the cavity. The lid comprises an inner layer disposed in a face-to-face relationship to the beacon, an outer layer opposed to the inner layer and including an exterior surface, and an intermediate layer. The intermediate layer is situated between the inner and outer layers and comprises an energy storage device in communication with a harvesting antenna. The harvesting antenna is situated within a pathway of the emitted magnetic dipole field.

DETAILED DESCRIPTION

Figure 7:
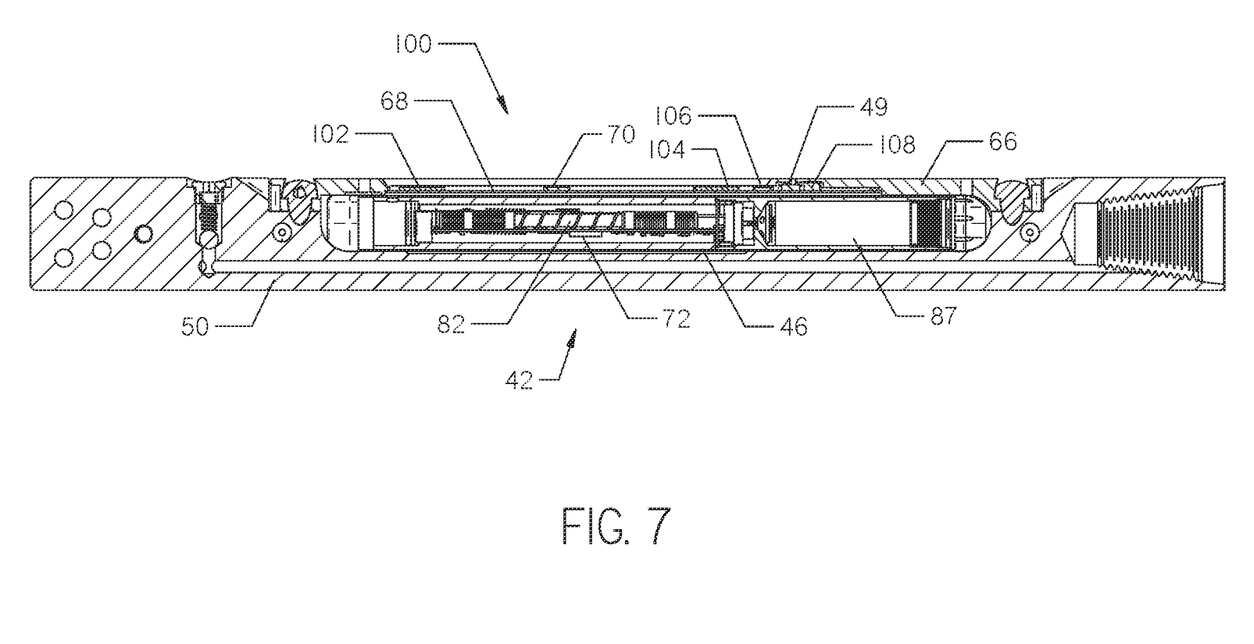
FIG. 7 is the cross-sectional view of the downhole tool shown in FIG. 4, but one embodiment of a downhole energy harvesting system is shown installed within the downhole tool and the beacon is shown in cross-section.
Figure 8:
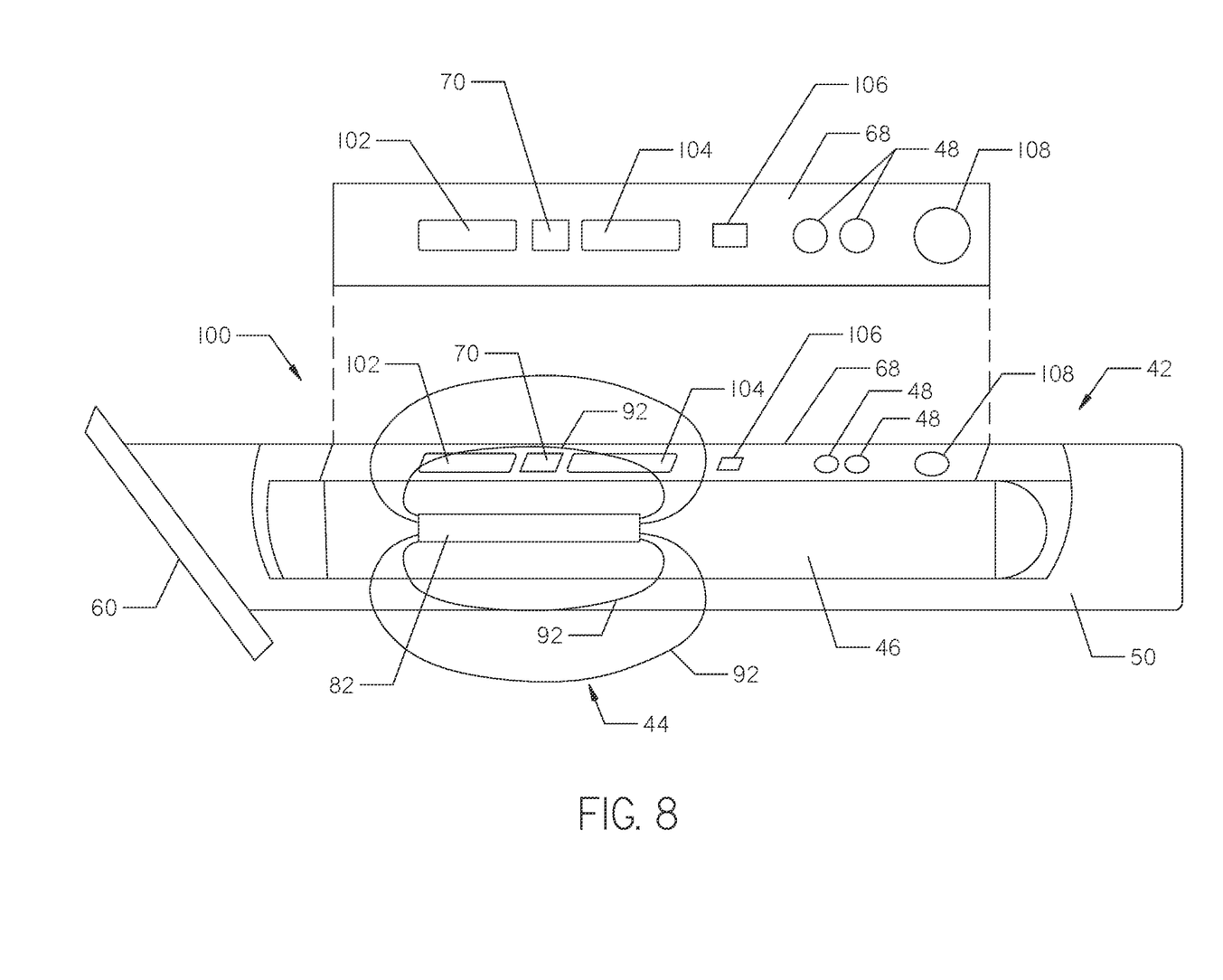
FIG. 8 is a simplified drawing of a perspective and cross-sectional view of the downhole tool and installed downhole energy harvesting system shown in FIG. 7, but the lid has been removed from the downhole tool and the circuit board is shown in a perspective and top plan view. A drill bit is also shown attached to the downhole tool.
Figure 9:
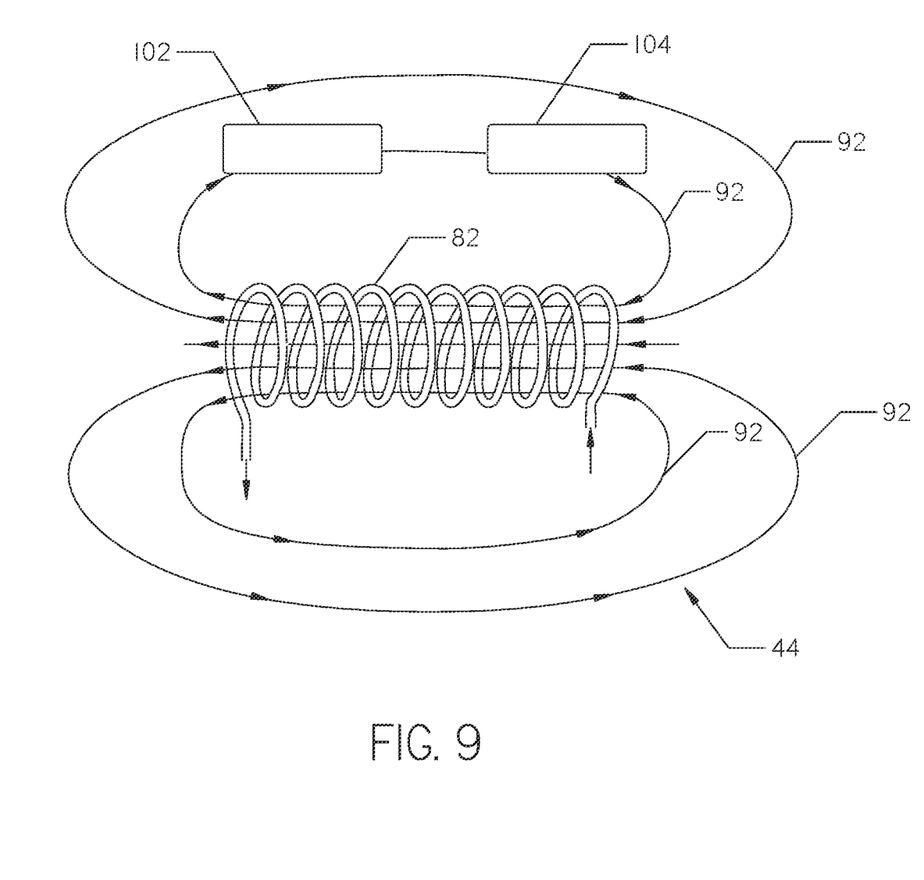
FIG. 9 is a diagram of the interaction between the transmitting antenna and harvesting antennas shown in FIGS. 7 and 8 during operation.
Figure 10:
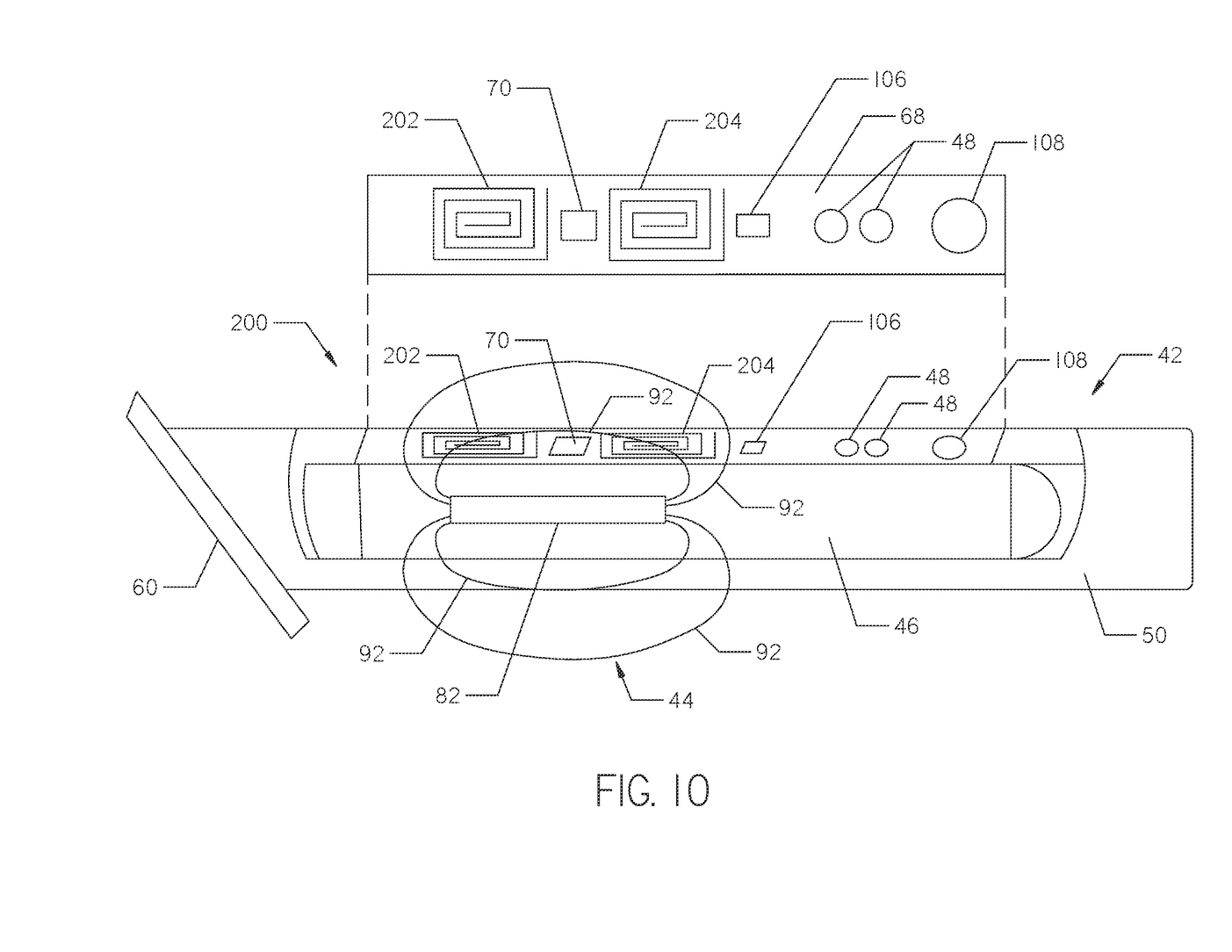
FIG. 10 is the simplified drawing of a perspective and cross-sectional view of the downhole tool shown in FIG. 8, but another embodiment of a downhole energy harvesting system is shown installed therein.
Figure 11:
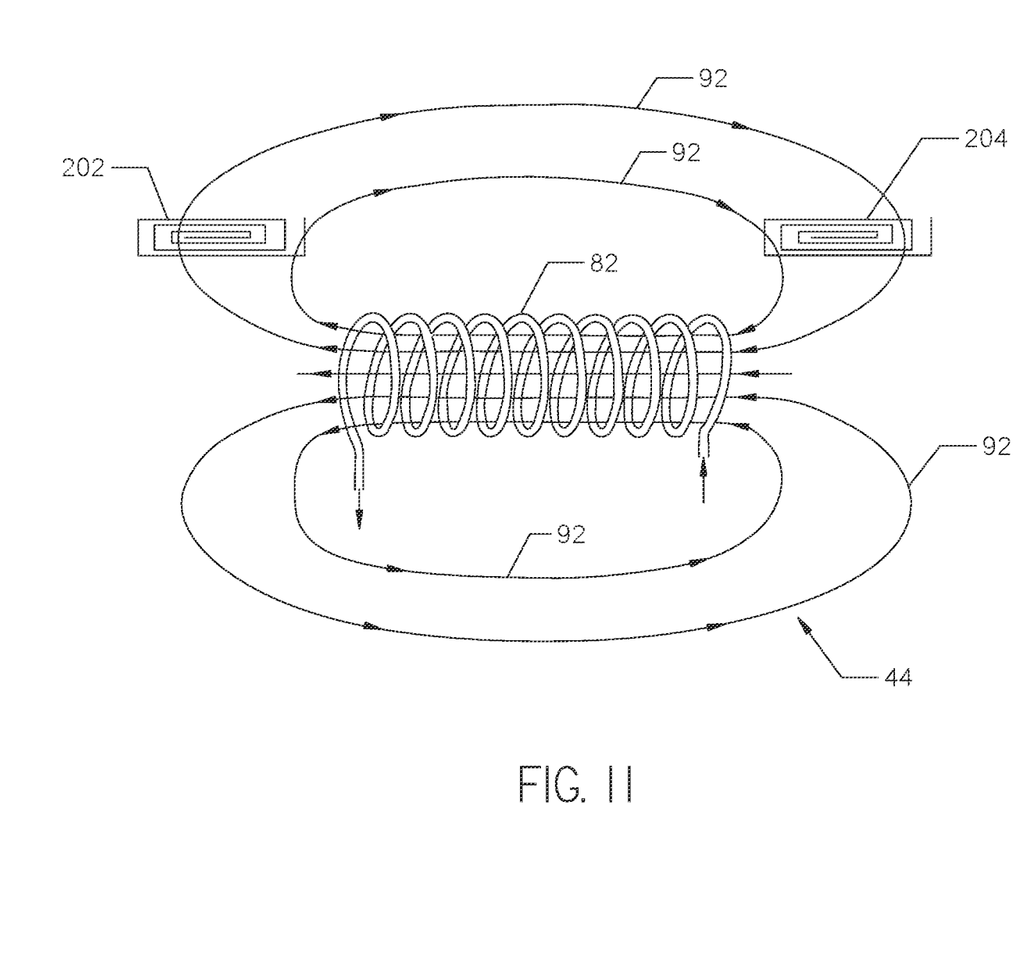
FIG. 11 is a diagram of the interaction between the transmitting antenna and harvesting antennas shown in FIG. 10 during operation.

With reference to FIGS. 7-11, the present application discloses various embodiments of downhole energy harvesting systems. One embodiment of a downhole energy harvesting system 100 is shown in FIGS. 7-9. Another embodiment of a downhole energy harvesting system 200 is shown in FIGS. 10 and 11. The systems 100 and 200 are configured to be installed within a downhole tool, such as the embodiment of a downhole tool 42 shown in FIGS. 2-5. As will be described in more detail herein, the systems 100 and 200 are configured to continually harvest power from the beacon signal 44 emanating from the beacon 46 installed within the downhole tool 42, as shown in FIGS. 8 and 10. The harvested power is used to power one or more sensors 48 or 49 and other electronics installed within the downhole tool 42, but outside of the beacon housing 84, throughout the course of the boring operation.

Turning to FIGS. 2-5, the downhole tool 42 is shown in more detail and will be described prior to describing the downhole energy harvesting systems 100 and 200 to be installed therein. The downhole tool 42 is just one embodiment of a downhole tool that may utilize the systems 100 and 200 or other systems disclosed herein. Other embodiments of downhole tools known in the art and not shown herein may also be used.

Figure 2:
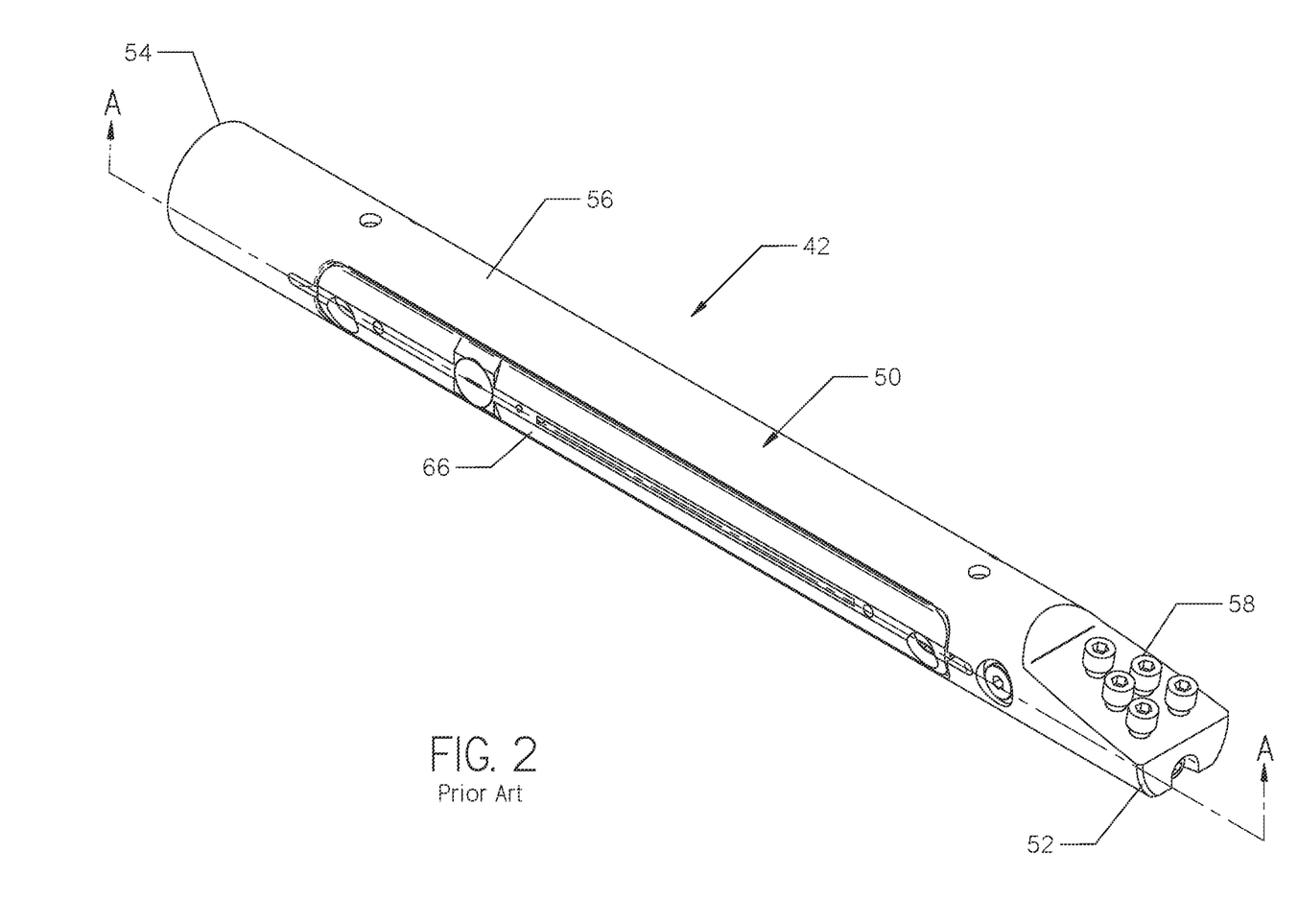
FIG. 2 is a side perspective view of one embodiment of a downhole tool.

Continuing with FIG. 2, the downhole tool 42 comprises an elongate housing 50 having opposed first and second ends 52 and 54 and an exterior surface 56. A plurality of bit connectors 58, configured to secure a drill bit 60 to the downhole tool 42, as shown in FIGS. 8 and 10, are supported on the first end 52 of the housing 50. The second end 54 of the housing 50 is configured to attach to the second end 28 of the drill string 20, as shown in FIG. 1.

Figure 3:
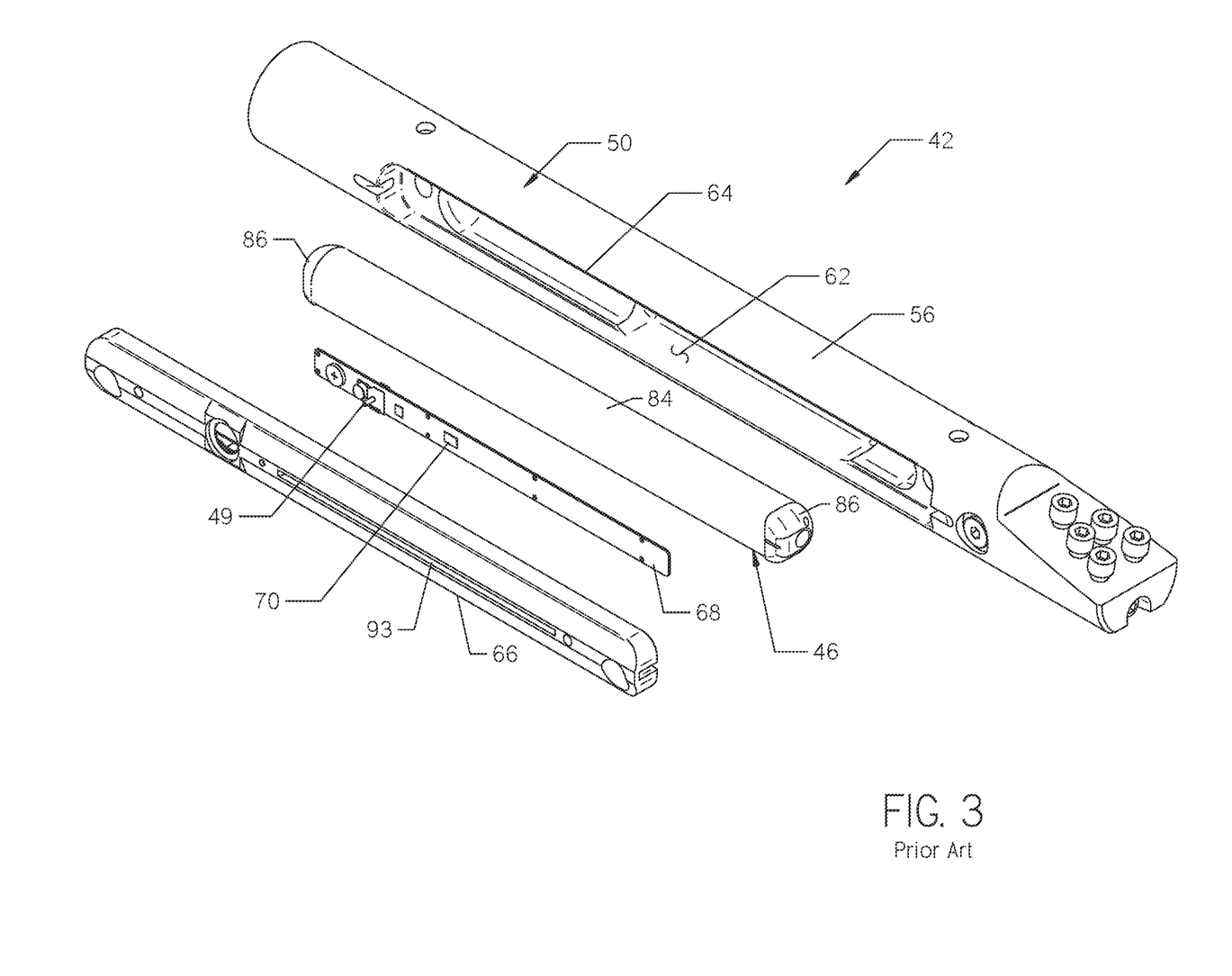
FIG. 3 is a side perspective and exploded view of the downhole tool shown in FIG. 2.

Turning to FIG. 3, a cavity 62 is formed within the housing 50 for receiving the beacon 46. The cavity 62 extends parallel to a longitudinal axis of the housing 50 and has an open mouth 64 that joins the exterior surface 56 of the housing 50. The mouth 64 is covered by a lid 66, as shown in FIG. 2. An interior surface 68 of the lid 66 is sized to receive a circuit board 68. The circuit board 68 is configured to support a plurality of various electronics that are better served positioned outside of the beacon housing 84. The electronics may comprise one or more sensors, a microprocessor, an energy storage device, etc. The embodiment shown in FIGS. 3-5 comprises the pressure sensor 49. In alternative embodiments, the one or more sensors may comprise, for example, a temperature sensor, a tension sensor, an accelerometer, an inclinometer, etc., in place of or in addition to the pressure sensor 49.

Continuing with FIGS. 3 and 6, the beacon 46 is configured to encode the data from the sensors, such as the pressure sensor 49, into the beacon signal 44 to be transmitted to the above-ground tracker 32. Because the sensors, such as the pressure sensor 49, are positioned outside of the beacon housing 84, the electronics further comprise devices needed to allow communication between the sensors and the beacon 46. Such communication devices may comprise antennas, radios, or other devices capable of communicating with one another. For example, the embodiments shown in FIGS. 3, 8, and utilize a Bluetooth radio 70. The Bluetooth radio 70 is configured to transmit data received by the sensors to another Bluetooth radio 72 included in the beacon 46, as shown in FIG. 6.

Figure 4:
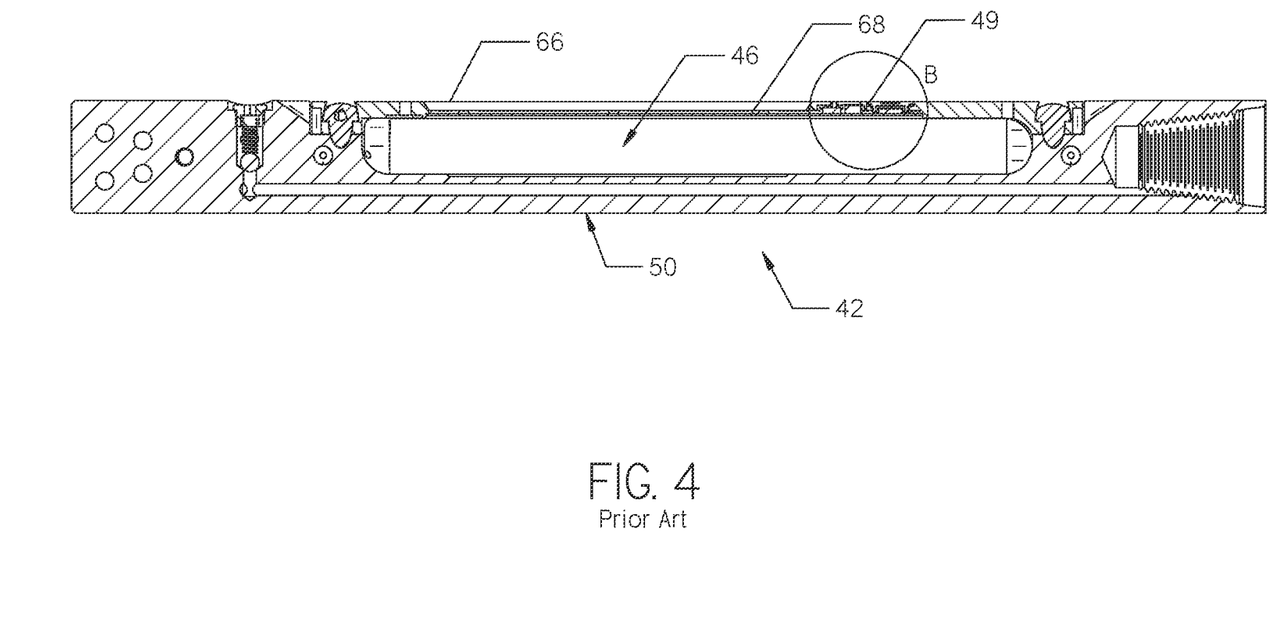
FIG. 4 is a cross-sectional view of the downhole tool shown in FIG. 2, taken along line A-A. The beacon installed within the downhole tool is not shown in cross-section.
Figure 5:
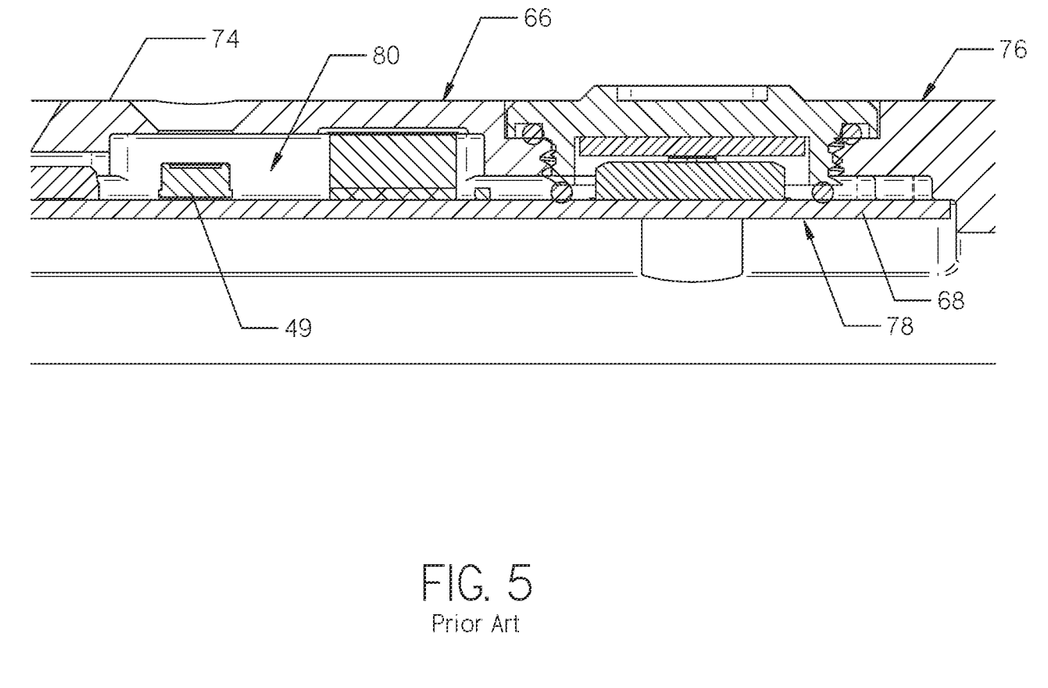
FIG. 5 is an enlarged view of area B shown in FIG. 4.

Turning to FIGS. 4 and 5, when the circuit board 68 is installed within the lid 66, the lid 66 may be characterized as having layers. An exterior surface 74 of the lid 66 may be characterized as an outer layer 76, the circuit board 68 may be characterized as an inner layer 78 of the lid 66, and the electronics supported on the circuit board 68, including the pressure sensor 49, may be characterized as an intermediate layer 80 of the lid 66, as shown in FIG. 5.

Continuing with FIG. 6, the tubular housing 84 of the beacon 46 is sealed closed by end caps 86 and is made of a non-conductive material, such as plastic. In addition to the transmitting antenna 82 and the battery 87, a processor 90, the Bluetooth radio 72, and other electrical circuitry may also be included within the tubular housing 84. As shown in FIGS. 8 and 10, during operation, the transmitting antenna 82 emits the beacon signal 44 from the beacon 46. The beacon signal 44 comprises a plurality of flux lines 92 that emanate from the beacon 46.

Turning back to FIG. 3, the downhole tool housing 50 and the lid 66 are preferably made of a durable ferrous metal so as to not break during drilling operations. However, ferrous metals attenuate the beacon signal 44. To allow the beacon signal 44 to escape from the housing 50, a window 92 is formed in the lid 66, as also shown in FIG. 2. The window 92 is characterized by an elongate slot and is positioned directly above the beacon 46 when the lid 66 is attached to the housing 50. The window 92 provides an opening for the beacon signal 44 to pass through the housing 50 during operation. The window 92 may be filled with a non-ferrous material, such as plastic or silicon. One or more additional slots may be formed in the housing 50 to serve as additional antenna windows for the beacon signal 44.

Turning now to FIGS. 7-9, the downhole energy harvesting system 100 is shown. The system 100 is shown installed within the downhole tool 42 in FIG. 7 and is shown installed within a simplified drawing of the downhole tool 42 with the lid 66 removed in FIG. 8. The same reference numbers will be used in FIG. 8 to designate the same components shown in FIG. 7, for ease of reference. The embodiment shown in FIG. 7 comprises the pressure sensor 49, while the embodiments shown in FIG. 8 comprises two sensors 48. However, in alternative embodiments, only one sensor 48 or more than two sensors 48 may be used. The sensors 48 may comprises any type of sensor known in the art to be used in a downhole tool, such as the previously mentioned pressure sensor, temperature sensor, tension sensor, an accelerometer, an inclinometer, etc.

The downhole energy harvesting system 100 comprises a first and second harvesting antenna 102 and 104 supported on the circuit board 68. The harvesting antennas 102 and 104 may be considered as part of the intermediate layer 80 of the lid 66. The harvesting antennas 102 and 104 are spaced apart from one another and each positioned near an end of the transmitting antenna 82 such that each antenna 102 and 104 is situated within a pathway of the emitted magnetic or beacon signal 44.

The harvesting antennas 102 and 104 shown in FIGS. 7-9 are each a ferrite rod. The ferrite rods are positioned so that a longitudinal axis of each rod lies parallel to a longitudinal axis of the transmitting antenna 82. In such position, the flux lines 92 emanating from the beacon 46 are also in a parallel relationship with the ferrite rods, as shown in FIG. 9. Such positioning concentrates the beacon signal 44 received by the antennas 102 and 104. In operation, each harvesting antenna 102 and 104 harvests or captures electromagnetic energy from the beacon signal 44 as it emanates out of the beacon 46.

In another embodiment, a single longer ferrite rod may be used in place of the two smaller and spaced-apart ferrite rods making up the harvesting antennas 102 and 104. However, using two smaller ferrite rods frees space for other electronics on the circuit board 68. For example, in FIGS. 7 and 8, the Bluetooth radio 70 is shown positioned between the harvesting antennas 102 and 104.

Continuing with FIGS. 7 and 8, the downhole energy harvesting system 100 further comprises a rectifier circuit 106 and an energy storage device 108 supported on the circuit board 68. Such components may also be considered part of the intermediate layer 80 of the lid 66. The energy storage device 108 may comprise a supercapacitor, battery, or other energy storage device known in the art. Energy harvested by each harvesting antenna 102 and 104 is transmitted to the rectifier circuit 106 where it is converted into usable continuous voltage energy. The converted energy is then transmitted to the energy storage device 108 where it is stored.

Energy stored in the storage device 108 is used to power the sensors 48 or 49 or other electronics, such as the Bluetooth radio 70, supported within the downhole tool 42. The harvesting antennas 102 and 104 may be characterized as being in communication with the energy storage device 108. Such communication is facilitated by the rectifier circuit 106. The energy storage device 108 is further in communication with the sensors 48 or 49 and other electronics.

The harvesting antennas 102 and 104 are configured to harvest power at a plurality of different frequencies within a frequency range, such as anywhere between 12 kHz and 46 kHz, for example. Specifically, the harvesting antennas 102 and 104 are configured to harvest power at the lowest frequency range, usually 12 kHz, but potentially lower. The lowest frequency ranges are the most difficult to harvest. In contrast, the higher the frequency, the easier it is to harvest energy. If the harvesting antennas 102 and 104 can capture energy at the lowest frequency, the antennas 102 and 104, as a matter of course, can capture energy from any frequency there above. Likewise, the harvesting antennas 102 and 104 are configured to harvest energy from the beacon signal 44 at a wide range of power levels. The higher the level of power the beacon signal 44 is transmitted at, the easier it is to harvest.

Configuring the antennas 102 and 104 to respond to a large range of frequencies ensures that energy is harvested from the magnetic signal 44 no matter what frequency the transmitting antenna 82 is tuned to. Some beacons can transmit the beacon signal 44 over a wide range of frequencies, for example, 32 different frequencies. The beacon 46, for example, may be configured to switch frequencies, at the direction of an operator, one or more times during the course of a single boring operation. Likewise, configuring the antennas 102 and 104 to respond to a large range of power levels ensures energy is harvested no matter the power level of beacon signal 44.

In summary, the harvesting antennas 102 and 104 are preferably configured to harvest power even when the transmitting antenna 82 is transmitting at the worst case harvesting scenario, the lowest frequency and low power. Even in this scenario, the harvesting antennas 102 and 104 can harvest enough power to adequately charge the energy storage device 108. However, the higher the frequency and power level, the faster the energy storage device 108 is charged.

During operation, the harvested energy may be stored temporarily in the energy storage device 108 and used only when needed for certain electronics. For example, it takes a lot of energy for the Bluetooth radio 70 to transfer its data to the beacon 46, but the data may not need to be transmitted very often—for example, every 30 seconds. In such case, the energy storage device 108 may be configured to store energy for 30 seconds before powering the Bluetooth radio 70 long enough to burst the data to the beacon 46. The Bluetooth radio 70 is then powered down between data transmission sessions.

As another example, energy may be harvested until the energy storage device 108 has enough energy to power the sensors 48 or 49, the Bluetooth radio 70, and/or other electronics powered by the energy storage device 108. Once the energy storage device 108 has enough power stored up, it powers the needed electronics and then begins storing energy again. In such embodiment, the energy storage device 108 may not power any electronics for extended periods of time or at non-uniform intervals.

As another example, the energy storage device 108 may be configured to store energy until energy is needed. For example, the Bluetooth radio 70 may be turned off until the system recognizes that the sensors 48 or 49 have measured critical data—for example, a pressure sensor measures a high level of downhole pressure. Upon measuring the critical data, energy stored within the energy storage device 108 is sent to the Bluetooth radio 70, allowing the radio to transmit the critical data to the beacon 46. In such embodiment, the energy storage device 108 may not power any electronics for extended periods of time, helping to ensure that the energy storage device 108 is charged when power is needed.

Turning now to FIGS. 10 and 11, the downhole energy harvesting system 200 is shown. Like FIG. 8, the system 200 is shown installed within a simplified drawing of the downhole tool 42 in FIG. 10. The system 200 functions in the same manner as the system 100, but the system 200 utilizes another embodiment of harvesting antennas 202 and 204. Like the antennas 102 and 104, the antennas 202 and 204 are situated within a pathway of the emitted magnetic or beacon signal 44.

Instead of ferrite rods, the harvesting antennas 202 and 204 are PCB trace antennas supported on the circuit board 68. The harvesting antennas 202 and 204 may be considered as part of the intermediate layer 80 of the lid 66. The harvesting antennas 202 and 204 are spaced apart from one another and each positioned near an end of the transmitting antenna 82. Each harvesting antenna 202 and 204 is positioned so that the flux lines 92 intersect a longitudinal axis of each antenna 202 and 204 at a relatively perpendicular or non-zero angle, as shown in FIG. 11. Such positioning concentrates the beacon signal 44 received by the antennas 202 and 204.

In other embodiments, the harvesting antenna or antennas may comprise hand wound magnet wire or other types of antennas known in the art. The chosen system may be configured to store energy and power the electronics using any number of time intervals or methods, including those not specifically described herein.

If desirable, the harvesting antenna or antennas may also be configured to harvest power from a magnetic field at a single frequency, rather than a range of frequencies. This embodiment may be desirable if the beacon only emits a single frequency throughout the course of the boring operation. In such case, only a single one of the harvesting antennas 102, 104, 202, or 204 disclosed herein may be needed to harvest an adequate amount of energy from the magnetic signal.

In further alternative embodiments, the downhole energy harvesting systems disclosed herein may be incorporated into other embodiments of downhole tools. For example, such downhole tools may comprise other embodiments of lids or other methods of supporting the electronics within the housing of the downhole tool. For example, the electronics, including the sensors, and the components used with the systems 100 or 200 may be supported within a cavity formed in the interior of the downhole tool 42 instead of being supported within the lid 66. Thus, the electronics and the components of the systems 100 or 200 would be supported within the downhole tool 42 below the beacon 46, rather than above. The systems 100 or 200 would function in the same manner as described herein.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A downhole tool, comprising:
   an elongate housing having a cavity formed therein;
   a beacon installed within the cavity and comprising a transmitting antenna, the transmitting antenna configured to emit a magnetic signal;
   a harvesting antenna installed within the housing and situated within a pathway of the emitted magnetic signal; and
   an energy storage device installed within the housing and in communication with the harvesting antenna and one or more sensors installed within the housing;
   in which the harvesting antenna is configured to harvest power from the magnetic signal and transmit the harvested power to the energy storage device.

2. The downhole tool of claim 1, in which the harvesting antenna is a first harvesting antenna, the downhole tool further comprising:
   a second harvesting antenna installed within the housing and situated within the pathway of the emitted magnetic signal;
   in which the second harvesting antenna is in communication with the energy storage device and configured to harvest power from the magnetic signal and transmit the harvested power to the energy storage device.

3. The downhole tool of claim 2, in which the transmitting antenna has opposed first and second ends; and in which the first harvesting antenna is positioned adjacent the first end of the transmitting antenna and the second harvesting antenna is spaced from the first harvesting antenna and is positioned adjacent the second end of the transmitting antenna.

4. The downhole of claim 1, further comprising:
   a lid sized to close the cavity formed within the housing; and
   a circuit board installed within the lid;
   in which the harvesting antenna, the energy storage device, and the one or more sensors are supported on the circuit board.

5. The downhole tool of claim 1, in which the harvesting antenna communicates with the energy storage device via a rectifier circuit.

6. The downhole tool of claim 1, in which the harvesting antenna is configured to harvest power from the magnetic signal within a frequency range of 12 kHz to 46 kHz.

7. The downhole tool of claim 1, in which the harvesting antenna is a ferrite rod.

8. The downhole tool of claim 7, in which the magnetic signal comprises a plurality of flux lines; and in which the ferrite rod is positioned parallel to the flux lines.

9. The downhole tool of claim 1, in which the harvesting antenna is a PCB antenna.

10. The downhole tool of claim 9, in which the magnetic signal comprises a plurality of flux lines; and in which the PCB antenna is positioned perpendicular to the flux lines.

11. The downhole tool of claim 1, in which the energy storage device is a supercapacitor.

12. The downhole tool of claim 1, in which the magnetic signal is configured to transmit data collected from the one or more sensors to an above-ground tracker.

13. A downhole tool, comprising:
    a beacon configured to emit a magnetic dipole field;
    an elongate housing having an exterior surface within which a cavity is formed, the cavity receiving the beacon and having an open mouth that joins the exterior surface of the housing;
    a lid configured to close the mouth of the cavity, and comprising:
      an inner layer disposed in a face-to-face relationship to the beacon;
      an outer layer opposed to the inner layer and including an exterior surface; and
      an intermediate layer situated between the inner and outer layers and comprising an energy storage device in communication with a harvesting antenna, the harvesting antenna situated within a pathway of the emitted magnetic dipole field.

14. The downhole tool of claim 13, in which the harvesting antenna is a ferrite rod situated in a parallel-relationship with the beacon.

15. The downhole tool of claim 13, in which the intermediate layer further comprises:
    one or more sensors in communication with the energy storage device.

16. The downhole tool of claim 13, in which the energy storage device is a supercapacitor.

17. The downhole tool of claim 13, in which the harvesting antenna is a PCB antenna.

18. The downhole tool of claim 13, in which the inner layer comprises a circuit board; and in which the energy storage device and the harvesting antenna of the intermediate layer are supported on the circuit board.

19. The downhole tool of claim 13, in which the harvesting antenna is a first harvesting antenna, the intermediate layer further comprising:

a second harvesting antenna in communication with the energy storage device and situated within a pathway of the emitted magnetic dipole field.

20. The downhole tool of claim 13, further comprising:
a drill bit attached to a first end of the housing.

21. A system, comprising:
an elongate drill string having a first end and a second end;
a horizontal directional drilling machine operatively engaged to the first end of the drill string; and
the downhole tool of claim 20 attached to the second end of the drill string.

* * * * *